United States Patent [19]

Takahashi

[11] Patent Number: 4,979,115

[45] Date of Patent: Dec. 18, 1990

[54] METHOD AND DEVICE FOR CONTROLLING REAR-WHEEL STEERING OF AUTOMOTIVE VEHICLE

[75] Inventor: Akira Takahashi, Tokyo, Japan

[73] Assignee: Fuji Jukogyo Kabushiki Kaisha, Tokyo, Japan

[21] Appl. No.: 312,472

[22] Filed: Feb. 21, 1989

[30] Foreign Application Priority Data

Feb. 25, 1988 [JP] Japan ............................ 63-42810

[51] Int. Cl.$^5$ ............................................ B62D 6/02
[52] U.S. Cl. ............................ 364/424.05; 180/140; 280/91
[58] Field of Search ................ 364/424.01, 424.05; 180/140-143; 280/91

[56] References Cited

U.S. PATENT DOCUMENTS

| 4,657,102 | 4/1987 | Kanazawa et al. | 180/140 |
| 4,687,214 | 8/1987 | Uno | 280/91 |
| 4,768,603 | 9/1988 | Sugiyama et al. | 180/140 |
| 4,779,693 | 10/1988 | Takahashi et al. | 180/140 |
| 4,796,904 | 1/1989 | Kubo et al. | 280/91 |
| 4,805,939 | 2/1989 | Kanazawa et al. | 280/91 |
| 4,811,805 | 3/1989 | Yoshida et al. | 180/140 |
| 4,828,064 | 5/1989 | Furutani et al. | 180/140 |

Primary Examiner—Thomas G. Black
Attorney, Agent, or Firm—Beveridge, DeGrandi & Weilacher

[57] ABSTRACT

In an automotive vehicle having a four-wheel steering system in which, at least in the low and medium vehicle speed range, the rear wheels are steered in the reverse-phase direction relative to the front wheels in accordance with the steering force or steering angle of the front wheels and with the front-wheel steering speed. The method comprises the steps of deciding at low and medium vehicle speeds, a rear-wheel steering speed reference value determined in dependence on the front-wheel steering speed, increasing the reverse-phase direction steering speed of the rear wheels for low front-wheel steering speeds, and reducing the reverse-phase direction steering speed of the rear wheels for high front wheel steering speeds. The reference value of the rear-wheel steering speed in a large range of the front-wheel steering speed is controlled to be zero or to be in the coincident-phase direction. The reference value is also varied in the direction for reducing the degree of the reverse-phase direction as the vehicle speed increases, with the vehicle speed as a parameter.

12 Claims, 3 Drawing Sheets

METHOD AND DEVICE FOR CONTROLLING REAR-WHEEL STEERING OF AUTOMOTIVE VEHICLE

BACKGROUND OF THE INVENTION

This invention relates to steering systems of automotive vehicles and more particularly to a method and device for controlling to steer rear wheels of a four-wheel steering system of an automotive vehicle (hereinafter referred to as vehicle).

There have been proposed and developed four-wheel steering systems of vehicles of the type wherein a reference value of the rear-wheel steering angle is determined from the steering angle of the steering wheel and the vehicle speed, and the rear wheels are steered in accordance with this reference value. In these four-wheel steering systems, there is one wherein means for detecting the steering angular speed of the steering wheel is provided, and thus a reference value of the rear-wheel steering speed is determined in accordance with the steering angular speed. Then, by steering the rear-wheel at the speed of this reference value, rear-wheel steering without response delay can be realized. One example of this steering system is disclosed in Japanese Patent Laid-Open Publication No. 149562/1987.

According to the prior art like this, in a range of low and high vehicle speeds, the rear wheels are steered in reverse-phase (opposite) direction relative to the front wheels so as to improve the turning ability. And, in a range of high vehicle speed, the rear wheels are steered in the coincident-phase direction same as the front wheels thereof in order to secure safety drive. In this case being provided, a device for controlling the rear-wheel steering speed in proportion to the steering wheel angular speed and being reduced the response delay of the rear wheels, the following problem arises. That is, when the rear wheels are abruptly steered in the reverse-phase direction in order to avoid a danger or a critical situation as a corrective steering manipulation during driving at low or medium speed in an abnormal state, control becomes difficult by the low convergence of the wheel movements.

SUMMARY OF THE INVENTION

It is an object of the present invention to overcome the above described problem.

According to the present invention, there is provided a method for controlling to steer the rear wheels of an automotive vehicle having a four-wheel steering system in which, at least in a lower vehicle speed range than a predetermined value, the rear wheels are steered in the reverse-phase direction relative to the front wheels in accordance with steering force or steering angle of the front wheels and with front-wheel steering speed. The method comprises steps of deciding a rear-wheel steering speed reference value determined by front-wheel steering speed, increasing reverse-phase direction steering speed of the rear wheels for low front-wheel steering speed at the lower vehicle speed than the predetermined value and reducing the reverse-phase direction steering speed of the rear wheels for high front wheel steering speeds.

In another aspect thereof, this invention provides a control device to steer a rear-wheel of an automotive vehicle having a four-wheel steering system comprising a computing device for calculating assist torque of steering, a sensor for steering wheel steering direction and speed, a vehicle speed sensor, a rear-wheel steering angle sensor, a front-wheel steering speed sensor, a rear-wheel steering speed sensor, and a control unit responsive to respective detected signals from the computing device and the sensors for operating to steer the rear wheels in a reverse-phase direction, which comprises: first calculating means responsive to output signals from the computing device and from the vehicle speed sensor for receiving as input the steering torque and for generating a rear-wheel steering angle reference value; second calculating means responsive to the rear-wheel steering angle reference value and signals of an actual steering angle from the rear-wheel steering angle sensor for deciding a rear-wheel steering angle deviation and an actual value and for generating a deviation signal representing the deviation between the reference value and the actual value; and third calculating means responsive to the deviation signal, detected signals from the vehicle speed sensor, detected signals from the front-wheel steering speed sensor, and the detected signal from the rear-wheel steering speed sensor for deciding a rear-wheel steering speed reference value and for generating a rear-wheel steering speed reference value, which is transmitted to rear-wheel steering means of the four-wheel steering system so as to steer the rear wheels in the reverse-phase direction relative to the front wheels in accordance with the steering force or steering angle of the front wheels and with the front-wheel steering speed, and, so as to increase a reverse-phase direction steering speed of the rear wheels for low front-wheel steering speeds and to reduce the reverse-phase direction steering speed of the rear wheels for high front wheel steering speeds at least in a lower vehicle speed range than a predetermined value.

As described above, during driving at a lower vehicle speed than the predetermined value with normal steering wheel manipulation, the rear wheels with respect to the front-wheel steering are steered in the reverse-phase direction in appropriate following-up action to the front wheels, whereby comfortable cornering with optimum steering maneuverability can be carried out, and good feeling of driving can be obtained.

On the other hand, in an abnormal state wherein the steering wheel is turned abruptly while the vehicle is being driven at low or medium speed in order to avoid danger, for example, the reverse-phase direction steering of the rear wheels is largely delayed relative to the front wheels. The rear-wheel reverse-phase steering is virtually largely restrained. As a result, the stability of the vehicle is improved, and dangerous vehicle motions such as weaving and spinning can be prevented.

The further features of the present invention will become understood from the following detailed description referring to the accompanying drawings.

DETAILED DESCRIPTION OF THE PREFERRED EMBODIMENTS

Figure 1:
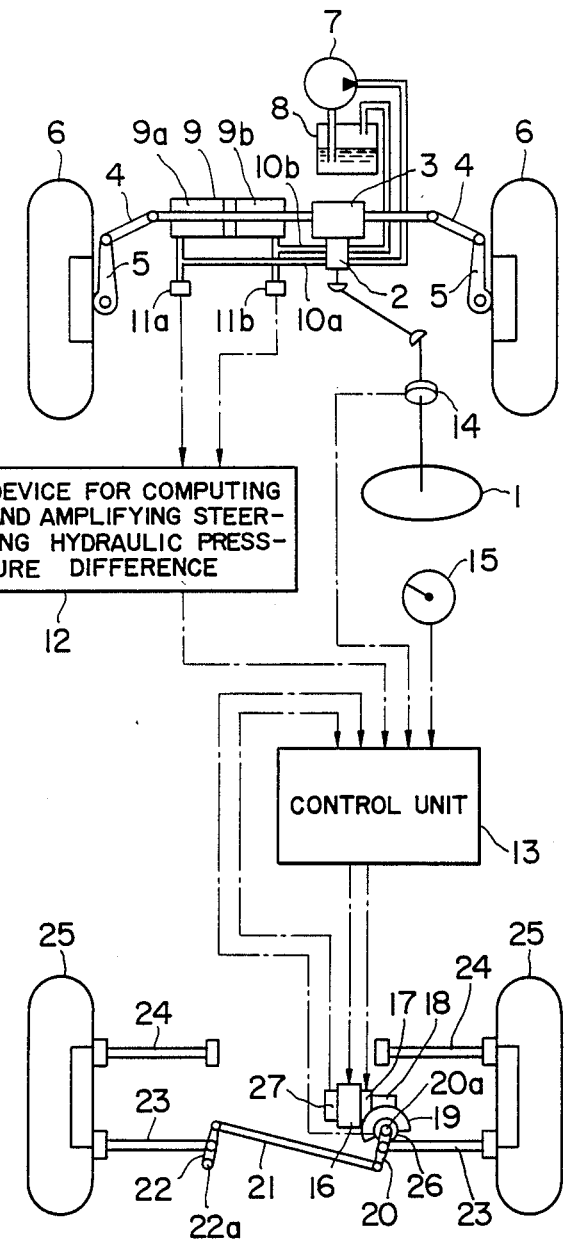
FIG. 1 is a schematic plan view and a block diagram showing a four-wheel steering system of an automotive vehicle to which this invention is applied.

Referring to FIG. 1, front wheels 6, 6 of a vehicle are steered by a steering wheel 1, rotational torque of which is transmitted by way of a gear box 3 (for front-wheel steering), tie rods 4, and knuckle arms 5 to the front wheels 6. At the same time, the steering torque of the steering wheel 1 actuates a control valve 2. Then a pump 7 delivers oil to one of left and right hydraulic chambers 9a and 9b of a hydraulic power cylinder 9 through either of left and right hydraulic lines 10a and 10b. The pump 7 is driven by the vehicle engine (not shown). Assist torque is generated in a desired steering direction. The manual turning force required to rotate the steering wheel is reduced. The hydraulic pump 7 discharges hydraulic fluid (oil) from a reservoir tank 8, to which the oil exceeded is returned.

Left and right hydraulic (oil) pressure sensors 11a and 11b are respectively installed at intermediate positions of the above described left and right hydraulic lines 10a and 10b and operate to detect the hydraulic pressures of the hydraulic lines 10a and 10b and to transmit corresponding hydraulic pressure detection signals to a device 12 for computing and amplifying hydraulic pressure difference between the lines 10a and 10b.

The device 12 computes the assist (or power) steering torque from the difference between the two output signals of the two hydraulic pressure sensors 11a and 11b and transmits an assist steering torque signal corresponding to the assist steering torque to a control unit 13.

The steering wheel mechanism is provided with a steering wheel angular speed sensor 14 which operates in response to the rotation of the steering wheel 1 to determine the steering rotational direction. The sensor 14 detects the angular speed and transmits a steering angular speed signal in accordance with the angular speed to the control unit 13. A vehicle speed sensor 15 is provided to detect the vehicle speed and to transmit a corresponding vehicle speed signal to the control unit 13.

The rear wheels 25, 25 of the vehicle are mounted on a chassis frame (not shown) of the vehicle via a rear wheel suspension which includes rear lateral links 23 and front lateral links 24.

The rear wheels are steered by a rear-wheel steering mechanism comprising: an electric motor 16 controlled by signals from the control unit 13; an electromagnetic clutch 17 actuated by the motor 16; a worm gear 18 connected to the clutch 17 to rotate a worm sector 19; a rotating shaft 20a on which the worm sector 19 is fixedly supported; a right-side lever 20 pivoted at one end of the rotating shaft 20a and connected at an intermediate point of an inner (left) end of the rear lateral link 23 on the right side; a connecting rod 21 connected at its right end to the other end of the right-side lever 20; and a left-side lever 22 pivotally supported at its one end by a pivotal shaft 22a and connected at its end to the left end of the connecting rod 21 and at an intermediate position to the right end of the rear lateral link 23 on the left side.

By this arrangement of mechanism, the rear lateral links 23 shift substantially in the left and right directions as the left-side and right-side levers 22 and 20 swing, and the rear wheels 25 are thus steered to the right and left.

Furthermore, the motor 16 assists steering operation in response to a control signal from the control unit 13. An output shaft of the motor 16 is coupled to the electromagnetic clutch 17 which has an exciting coil. When the exciting coil is supplied with current to switch "ON", the electromagnetic clutch 17 engages the shaft.

A rotational angle sensor 26 is connected to the rotating shaft 20a of the worm sector 19 and the right-side lever 20 for detecting the rotational angle thereof and transmitting a detected signal to the control unit 13.

Furthermore, the rotational speed of the motor 16 is detected by a motor speed sensor 27, which also transmits its detected signal to the control unit 13.

In the hydraulic-type power steering system as described above, since a steering assist torque depending on hydraulic pressure is generated in accordance with the steering torque of the steering wheel, the hydraulic pressure difference in the power cylinder 9 corresponds to the steering torque of the steering wheel 1. Moreover, this hydraulic pressure difference corresponds also to the holding torque of the steering wheel 1 relative to the cornering force of the front wheels 6. Therefore, a signal M fed into the control unit 13 from the device 12 for computing and amplifying the steering hydraulic pressure difference is a detected signal of the front-wheel assist torque. At the same time, it can be considered to be a detected signal of the front-wheel steering torque or of the front-wheel cornering force. Thus these signals are regarded as the steering force signal M of the front wheels.

Figure 2:
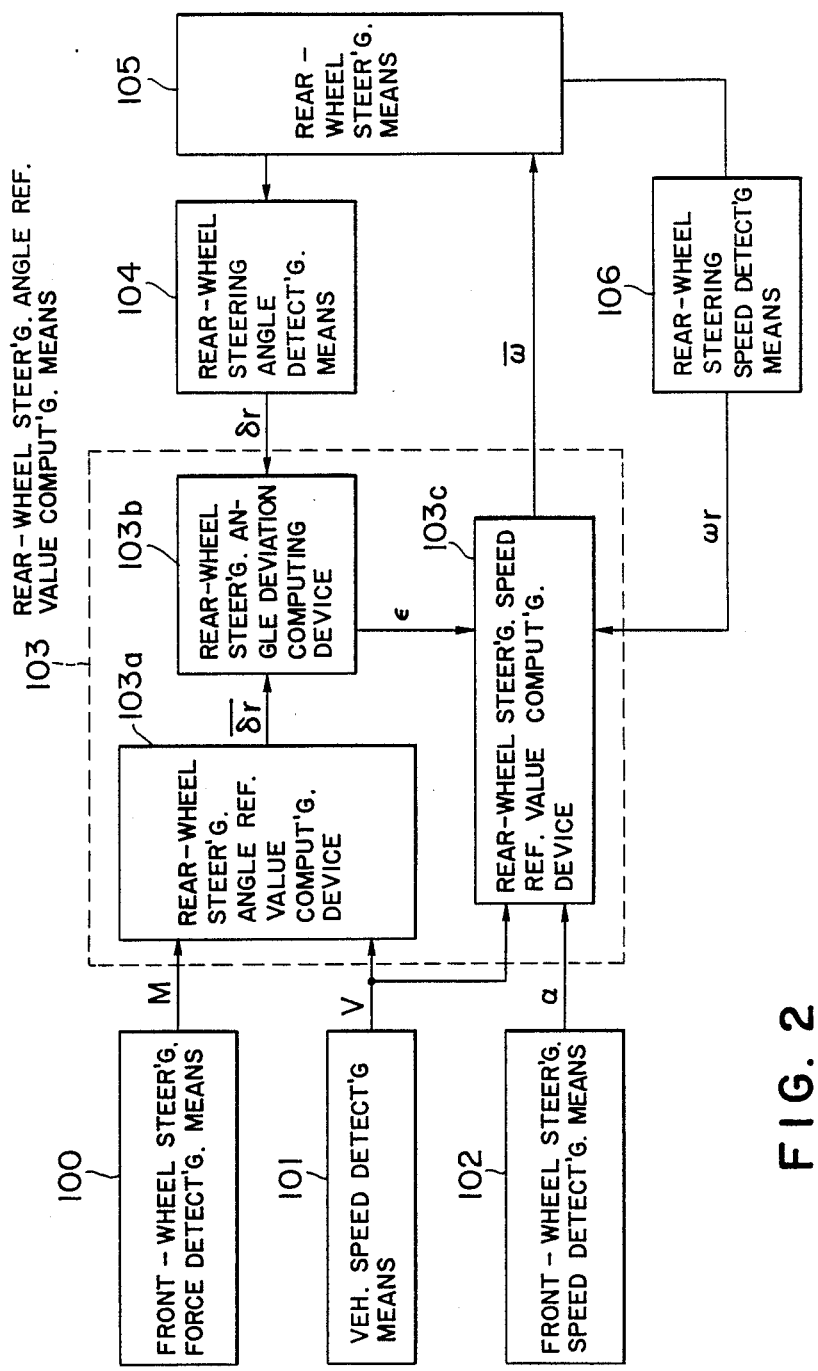
FIG. 2 is a block diagram of the rear-wheel steering system to which the steering control method and device of the present invention is applied.

The control unit 13 has a rear-wheel steering angle reference value computing means 103 comprising a rear-wheel steering angle reference value computing device 103a, a rear-wheel steering angle deviation computing device 103b, and a rear-wheel steering speed reference value computing device 103c. As shown in FIG. 2, the computing means 103 is responsive to the steering force signal M of a front-wheel steering force detecting means 100 comprising the hydraulic pressure sensors 11a and 11b and the device 12 for computing and amplifying steering hydraulic pressure difference and a vehicle speed signal V of a vehicle speed detecting means 101 comprising the vehicle speed sensor 15.

In the computing means 103, these input signals M and V are fed to the rear-wheel steering angle reference value computing device 103a, which computes a rear-wheel steering angle reference value $\bar{\delta}r$. A rear-wheel steering angle detecting means 104 comprising the rotational angle sensor 26 operates to detect an actual value of the rear-wheel steering angle $\delta r$. The rear-wheel steering angle deviation computing device 103b is responsive to the values $\bar{\delta}r$ and $\delta r$ and computes deviation $\epsilon$ thereof and transmits the deviation $\epsilon$ to the rear-wheel steering speed reference value computing device 103c.

Figure 3:
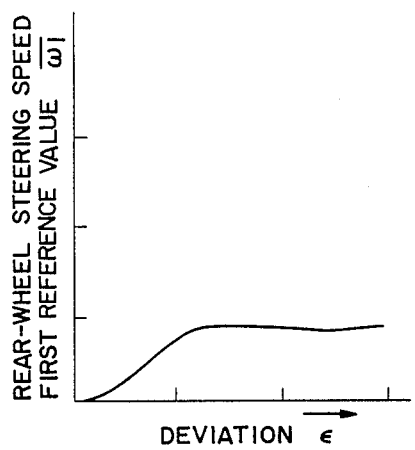
FIG. 3 is a graph indicating the setting characteristic of a first reference value of the rear-wheel steering speed.

The device 103c operates to determine a first reference value $\bar{\omega}_1$ of the rear-wheel steering speed according to the magnitude of the deviation $\epsilon$ so as to reduce the deviation $\epsilon$ indicated in FIG. 3. At the same time, the device 103c determines a second reference value $\bar{\omega}_2$ of the rear wheel steering speed from the front-wheel steering speed $\alpha$ detected by a front-wheel steering speed detecting means 102 comprising the steering wheel angular speed sensor 14. And then the device 103c determines a rear-wheel steering speed reference value $\bar{\omega}$ by summing up the two reference values $\bar{\omega_1}$ and $\bar{\omega_2}$. The reference value $\bar{\omega}$ is transmitted to a rear-wheel steering means 105 comprising the motor 16, whereby the rear wheels are steered at a steering speed of the reference value $\bar{\omega}$.

The steering speed of the rear wheels is used for feedback control as a rear-wheel steering speed signal $\omega r$ from a rear-wheel steering speed detecting means 106 comprising the motor speed sensor 27.

The second reference value $\bar{\omega_2}$ of the rear-wheel steering speed is determined as being proportional to the steering wheel angular speed (i.e., front-wheel steering speed). The second reference value $\bar{\omega_2}$ is added to the first reference value $\bar{\omega_1}$ of the rear-wheel steering speed determined by the deviation $\epsilon$ between the rear-wheel steering angle reference value $\bar{\delta r}$ and the actual value $\delta r$ of the rear-wheel steering angle thereby to obtain the rear-wheel steering speed reference value $\bar{\omega}$. Thus an actual value of the rear-wheel steering speed is determined. By this procedure, the larger the deviation $\epsilon$ the more rapidly the rear-wheel is steered. As a result, rear-wheel steering rapid response can be obtained, and the turning ability of the vehicle is improved.

In a known method of control as described above, the rear wheels are steered by a steering angle reference value of reverse-phase direction in the range of low and medium vehicle speeds. In this speed range, also, as indicated by intermittent line in FIG. 4, as the steering wheel angular speed increases, the second reference value of the rear-wheel steering speed is substantially proportionally increased. Therefore, in this range of low and medium vehicle speeds, if the steering wheel is manipulated abruptly in such a frantic manner as to avoid a danger or a critical situation, the rear wheels are also steered abruptly in the reverse-phase direction. As a consequence, the convergence of the wheel movements will become poor, whereby control becomes difficult.

The rear wheels are steered by a steering angle reference value of reverse-phase direction in a range of low and medium vehicle speeds. According to this invention, at these low and medium speeds, the second reference value of the rear-wheel steering speed relative to the steering wheel angular speed (i.e., front-wheel steering speed) is varied in the direction to increase the rear-wheel reverse-phase direction steering speed in the range of slow steering wheel angular speed and in the direction to decrease the rear-wheel reverse-phase direction steering speed when the steering wheel angular speed is in high range (e.g., 180° /sec or higher) as indicated by the curves A, A', B, and C shown in FIG. 4. The second reference value $\bar{\omega_2}$ of the rear-wheel steering speed obtained with this characteristic is added to the first reference value $\bar{\omega_1}$ of the rear-wheel steering speed indicated in FIG. 3. The rear wheels are steered by the reference value $\bar{\omega}$ of the rear-wheel steering speed thus obtained.

That is, when the front-wheels are steered at low or medium vehicle speed, the rear-wheel steering angle reference value $\bar{\delta r}$ is determined in accordance with the steering force signal M of the front wheels, and, in accordance with the difference or deviation $\epsilon$ between this reference value $\bar{\delta r}$ and the actual value $\delta r$ of the rear-wheel steering angle. The reference value $\bar{\delta r}$ is in the reverse-phase direction relative to the front wheels. Thus, the first reference value $\bar{\omega_1}$ of the rear-wheel steering speed is determined.

In this case of a normal driving condition when the steering wheel is turned at a relatively slow angular speed, for example, about 100 degrees/sec, the second reference value of the rear-wheel steering speed is larger than that of the prior art, whereby the rear-wheel steering speed reference value $\bar{\omega}$ is determined as the sum of $\bar{\omega_1}$ and $\bar{\omega_2}$ becomes large. The rear wheels are steered in the reverse-phase direction by a consequent quick reaction to steer the front-wheel. As a result, turning ability of the vehicle is improved, and the driver feels an extremely sharp and brisk steering sensitivity.

On the other hand, in the event of a frantic steering wheel manipulation during driving at low or medium speed, for example, in order to avoid some danger, not only does the steering wheel angular speed become high, but the steering wheel turning angle also becomes large.

Figure 4:
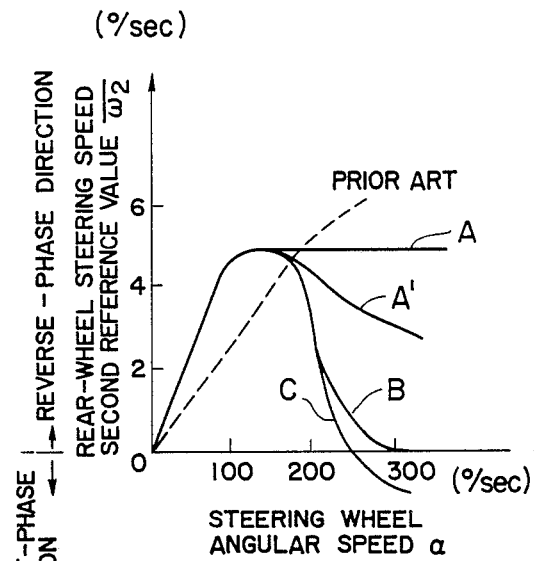
FIG. 4 is a graph of a second reference value of the rear-wheel steering speed as a function of steering wheel angular speed.

In such a case, the second reference value $\bar{\omega_2}$ of the rear-wheel steering speed reaches a level which is lower than that of the second reference value $\bar{\omega_2}$ as indicated by the curve A or A' in FIG. 4. Therefore, the sum of $\bar{\omega_1}$ and $\bar{\omega_2}$ also becomes low, and the rear wheels are steered considerably slowly in the reverse-phase direction. As a result, the rear wheels are not steered largely in reverse-phase direction, and the vehicle becomes unstable.

In the example indicated by curve B in FIG. 4, when the steering wheel angular speed exceeds a certain order (for example, of the order of 300 degrees/sec), the second reference value $\bar{\omega_2}$ of the rear-wheel steering speed becomes zero. And the rear-wheel steering speed is determined by only the first reference value $\bar{\omega_1}$ of the rear-wheel steering speed. As a consequence, the rear-wheel steering speed becomes even slower than that of curve A.

In the example indicated by curve C in FIG. 4, when the steering wheel angular speed is in a high range (for example, a range exceeding an order of 250 degrees/sec), the second reference value of the rear-wheel steering speed becomes one of coincident-phase direction. For this reason, when the steering wheel is turned abruptly, during the initial period of this turning, the sum of $\bar{\omega_1}$ and $\bar{\omega_2}$ becomes minus (negative). Therefore, the rear wheels are steered in the coincident-phase direction. Consequently, the rear wheels are steered slightly in the coincident-phase direction and are thereafter steered slowly in the reverse-phase direction because of the increase in the first reference value $\bar{\omega_1}$ of the rear-wheel steering speed accompanying with the increase in the difference or deviation $\epsilon$. As a result, the rear wheels are steered slowly than in the case of curve A, A', or B described above, and safety driving of the vehicle is further improved.

Figure 5:
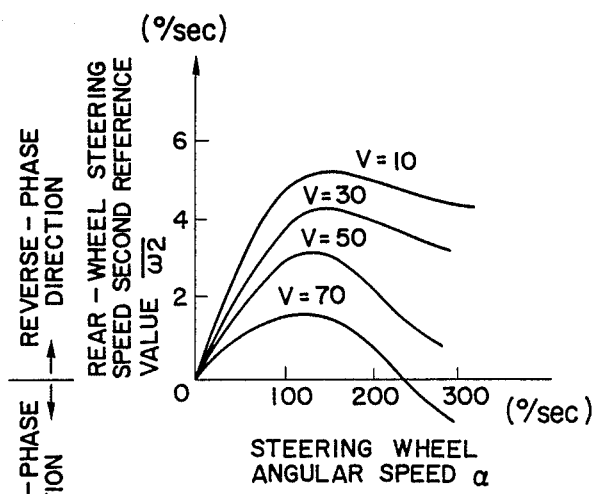
FIG. 5 is a graph indicating another example of the second reference value of the rear-wheel steering speed as a function of steering wheel angular speed.

In another embodiment of this invention as indicated in FIG. 5, the relationship between the steering wheel angular speed (i.e., front-wheel steering speed) and the second reference value of the rear-wheel steering speed is mapped in the direction for decreasing as a whole the degree of reverse-phase steering as the vehicle speed V increases.

In this example, also, when the vehicle is driven normally with slow steering wheel manipulation at any vehicle speeds in the range of low and medium vehicle speeds the reverse-phase direction steering speed of the rear wheels is increased, that is, the rear-wheel are rapidly steered in reverse phase. As a result, the reverse-phase steering of the rear wheels is carried out more quickly than heretofore. In an abnormal state wherein the steering wheel has been manipulated abruptly, the reverse-phase direction steering of the rear wheels is largely retarded, similarly as in the case of the example shown in FIG. 4.

The above described example illustrates the case where the present invention is applied to a method for determining the reference value $\overline{\delta r}$ of the rear-wheel steering angle in accordance with the steering force of the front wheels. However, the invention can be applied also to a method wherein the reference value of the rear-wheel steering angle is determined in accordance with the front-wheel steering angle. Furthermore, the rear-wheel steering means or mechanism are not limited to the illustrated examples in the drawings but can be applied to any known systems.

As described above, according to the present invention as the reference value of the steering angle of the rear wheels is determined in dependence on the steering force or the steering angle of the front wheels, the rear wheels are steered in the reverse-phase direction relative to the front wheels at low and medium vehicle speeds. At the same time, the reference value of the rear-wheel steering speed is determined from the deviation value between the rear-wheel steering angle reference value and the rear-wheel steering angle actual value and from the front-wheel steering speed.

In the rear-wheel steering device for steering the rear-wheel according to the reference value of the rear-wheel steering angle and the reference value of the rear-wheel steering speed in the range of low and medium vehicle speed, the reference value of the rear-wheel steering speed is increased in the rear-wheel reverse-phase direction in the range wherein the front-wheel steering speed is slow, and the reference value of the rear-wheel steering speed is decreased in the rear-wheel reverse-phase direction steering speed in the range wherein the front-wheel steering speed is high.

Therefore, in the normal driving condition, wherein the steering wheel is turned at relatively slow speed while the vehicle is driven at low or medium speed, the rear wheels are steered in reverse-phase direction in proper follow-up action relative to the front-wheel steering. Thus, the steering maneuverability is improved, and the driver can feel a comfortable driving sensitivity enhanced by a sharp steering response. On the other hand, in such an abnormal state as the steering wheel is manipulated abruptly, the reverse-phase direction steering of the rear wheels is largely retarded, and the reverse-phase direction steering of the rear wheels is substantially restrained as a whole. Therefore, there is no loss of the vehicle movements, whereby a weaving driving motion or a spinning motion can be avoided.

Thus, the safety driving is improved, and maneuverability and improvement of safety at low and medium vehicle speeds are both satisfied at the same time.

What is claimed is:

1. A method for controlling rear-wheel steering of an automotive vehicle having a steering wheel, front wheels, rear wheels, a front-wheel steering mechanism operatively connected to the steering wheel for operating the front wheels, a rear-wheel steering mechanism for operating the rear wheels, a detection device for detecting an assist steering torque, a first sensor for sensing rotational direction and speed of the steering wheel, a second sensor for sensing vehicle speed, a third sensor for sensing an actual rear-wheel steering angle, a fourth sensor for sensing a rear-wheel steering speed, and a control unit responsive to output signals from said detection device and said sensors for controlling the rear-wheel steering mechanism to steer the rear wheels in a reverse-phase direction relative to the front wheels at least in a lower vehicle speed than a predetermined vehicle speed, said method comprising the steps of:

computing a reference rear-wheel steering angle in response to said assist steering torque from said detection device and said vehicle speed from said second sensor;

calculating a deviation between said reference rear-wheel steering angle from said computing step and said actual rear-wheel steering angle from said third sensor;

determining a reference rear-wheel steering speed in response to said deviation from said calculating step and output signals from said first, second, and fourth sensors, said reference rear-wheel steering speed being varied to increase reverse-phase direction steering speed of the rear wheels for low front-wheel steering speed and to reduce the reverse-phase direction steering speed of the rear wheels for high front-wheel steering speed; and controlling said rear-wheel steering mechanism to steer said rear wheels in response to said reference rear-wheel steering speed from said determining step until said deviation reaches zero.

2. The method as claimed in claim 1, wherein the reference rear-wheel steering speed is controlled to be zero in a range of the large front-wheel steering speed.

3. The method as claimed in claim 1, wherein the reference rear-wheel steering speed is in the coincident-phase direction in a range of the large front-wheel steering speed.

4. The method as claimed in claim 1, wherein, with the vehicle speed as a parameter, the reference rear-wheel steering speed varies in the direction for reducing the degree of the reverse-phase direction as the vehicle speed increases.

5. The method as claimed in claim 1, wherein said rear wheels are steered in a reverse-phase direction relative to front wheels in accordance with steering angle of the front wheels.

6. A rear-wheel steering control device as claimed in claim 8, wherein said rear-wheel steering reference value comprises a first reference value and a second reference value.

7. A rear-wheel steering control device as claimed in claim 6, wherein said first reference value is determined by said deviation signal and said second reference value is determined by said front-wheel steering speed.

8. A rear-wheel steering control device for an automotive vehicle having a four-wheel steering system, comprising:

a computing device for calculating assist steering torque;

a steering wheel rotational direction and speed sensor;

a vehicle speed sensor;

a rear-wheel steering angle sensor;

a rear-wheel steering speed sensor; and a control unit for receiving detected signals from said computing device and said sensors and for operatively steering the rear wheels in a reverse-phase or coincide-phase direction by a rear-wheel steering reference value computing means which comprises:

rear-wheel steering angle reference value computing means responsive to output signals from said computing device and from said vehicle speed sensor for generating a rear-wheel steering angle reference value;

rear-wheel steering angle deviation calculating means responsive to said reference value and an actual value from said rear-wheel steering angle sensor for generating a deviation signal representing the deviation between said reference value and said actual value; and rear-wheel steering speed reference value calculating means responsive to said deviation signal, detected signals from said vehicle speed sensor, detected signals from said steering wheel rotational direction and speed sensor, and detected signals from said steering wheel rotational direction and speed sensor, and detected signals from said rear-wheel steering speed sensor for generating a rear-wheel steering speed reference value which is transmitted to rear-wheel steering means of said four-wheel steering system, whereby the rear wheels are steered in said reverse-phase direction relative to the front wheels in accordance with steering force of the front wheels and with the front-wheel steering speed at least in lower vehicle speed than a predetermined value, and said reverse-phase direction steering speed of the rear-wheels is increased for low front-wheel steering speed and said reverse-phase direction steering speed of the rear wheels is decreased for high front wheel steering speed.

9. The rear-wheel steering control device as claimed in claim 8, wherein the rear-wheel steering speed reference value is varied in the direction for reducing a degree of the reverse-phase direction as the vehicle speed increases.

10. The rear-wheel steering control device as claimed in claim 8, wherein said rear wheels are steered in the reverse-phase direction relative to the front wheels in accordance with the steering angle of the front wheel.

11. The rear-wheel steering controlling device as claimed in claim 8, wherein the reference value of the rear-wheel steering speed is zero in a range of the high front-wheel steering speed.

12. The rear-wheel steering control device as claimed in claim 8, wherein the reference value of the rear-wheel steering speed is in the coincident phase direction in the range of the high front-wheel steering speed.

* * * * *